US005261774A

United States Patent [19]

Le Floc'h et al.

[11] Patent Number: 5,261,774

[45] Date of Patent: Nov. 16, 1993

[54] DEVICE FOR LOADING AND/OR UNLOADING THE RACKS OF A LYOPHILIZATION TANK

[75] Inventors: Louis Le Floc'h, Garches; Claude Lambert, Verneuil-sur-Seine, both of France

[73] Assignee: Societe Anonyme dite: Societe d'Utilisation Scientifique et Industrielle du Froid: Usifroid, Maurepas, France

[21] Appl. No.: 983,263

[22] Filed: Nov. 30, 1992

Related U.S. Application Data

[63] Continuation of Ser. No. 615,628, Nov. 19, 1990, abandoned.

[30] Foreign Application Priority Data

Nov. 20, 1989 [FR] France ........ 89 15167
Aug. 2, 1990 [FR] France ........ 90 09901
Oct. 16, 1990 [FR] France ........ 90 12734

[51] Int. Cl.[5] ........ B65G 47/26

[52] U.S. Cl. ........ 414/331; 414/222; 414/799; 198/419.2; 198/434; 198/743

[58] Field of Search ........ 414/222, 331, 332, 352, 414/353, 395, 398, 518, 521, 525.1, 572, 679, 795.8, 799; 198/419.2, 430, 434, 739, 743

[56] References Cited

U.S. PATENT DOCUMENTS

| | | | |
|---|---|---|---|
| 2,542,330 | 2/1951 | Henderson et al. | 414/799 X |
| 3,724,639 | 4/1973 | Hara | 198/430 |
| 4,132,305 | 1/1979 | Mastak | 198/432 |
| 4,134,485 | 1/1979 | George | 198/434 X |
| 4,277,217 | 7/1981 | Miller et al. | 414/395 |
| 4,934,508 | 6/1990 | Vander Meer et al. | 198/434 |

FOREIGN PATENT DOCUMENTS

| | | |
|---|---|---|
| 0299139 | 3/1988 | European Pat. Off. . |
| 2528958 | 6/1983 | France . |
| 2185969 | 12/1986 | United Kingdom . |

*Primary Examiner*—Michael S. Huppert
*Assistant Examiner*—James Keenan
*Attorney, Agent, or Firm*—Birch, Stewart, Kolasch & Birch

[57] ABSTRACT

A device for loading and/or unloading the racks of a lyophilization tank operates such that vials 5 are collected and stored on a vibrating table 2 equipped with a mobile arm 8 blocking the vials on at least a part of the tray 3 of the vibrating table. A mobile transfer frame 11 carrying retractable flaps 15, 16 is adapted for moving between the flat surface 10 of a mobile carriage 1 and the tray 1 of the vibrating table for collecting and transferring the accumulated vials.

28 Claims, 10 Drawing Sheets

DEVICE FOR LOADING AND/OR UNLOADING THE RACKS OF A LYOPHILIZATION TANK

This application is a continuation of application Ser. No. 07/615,628, filed on Nov. 19, 1990, now abandoned.

Field of the Invention

The invention, which relates to the loading and/or unloading of the racks of a lyophilisation tank, concerns more precisely a device combining a vibrating feed table and a transfer frame.

BACKGROUND OF THE INVENTION

Description of Related Art

Lyophilisation tanks are used for treating products or substances generally contained in small sized vials. Advantageously, these vials are distributed as compactly as possible over several racks disposed above each other inside the tank. It is obviously indispensable to reduce the time for loading and unloading the racks or any other intermediate device as much as possible, so that the downtime of the tank, namely the time during which it is not operational, is as short as possible, for reasons of profitability but also to avoid as much as possible that the tank is in communication with the outside atmosphere for too long a time and so that water does not thus condense on the cold surface of the parts inside the chamber.

The arrangement is known which consists in using a carriage of constant height which moves at the level of an orifice giving access to the tank and arranging for the racks to be loaded or unloaded to be able to move each in their turn in the tank and to come up to the corresponding height. Compartments previously loaded with the product and disposed on the platform of the carriage are then transferred manually, for example by letting them slide over an extension of the platform in the direction of the tank.

It will be readily understood that this manual method of loading is slow and time-consuming and that it involves upstream or downstream work for pre-storing in the compartments which is quite incompatible with the above mentioned requirements of speed.

Tray transfer installations are also known for automatically loading the trays on said racks, which installations comprise an intermediate mobile transfer platform which is for example formed of a frame with wheels or rollers driven in rotation for moving each tray. Although automatic, these installations are not necessarily faster; they are in any case complicated and costly to use and require the manufacture and storage of a large number of appropriate trays.

Other automatic loading and unloading systems exist also which do not use transfer trays or compartments but which enable a set of vials to be introduced, by causing them to slide over a feed table. For that, the vials may be recovered on a transport belt which conveys them from the packing station as far as this table on which they are compactly assembled before being introduced, in batches, inside the tank, for example under the action of a pusher rake.

SUMMARY OF THE INVENTION

The object of the invention is then to provide a device for loading and/or unloading the racks of a lyophilisation tank provided for a plurality of vials coming from a station feeding said vials continuously, which device consists in collecting and storing said vials on a vibrating table equipped with at least one mobile means for blocking the vials over at least a part of the tray of the vibrating table, a mobile transfer frame with retractable flaps movable between an immediately adjacent flat surface and the tray of the vibrating table for collecting and transferring the accumulated vials.

The means for blocking the vials on the upper tray of the vibrating table are formed of a mobile arm, mounted along one edge of said table and pivotable about a vertical axis, so as to occupy a position transverse to the vibrating table, said arm being further able to slide heightwise along the vertical axis. Furthermore, a deflector flap, in the form of an arc of a circle, is disposed above the tray of the vibrating table, one of its ends extending to the belt feeding vials continuously on to the table.

According to another main characteristic of the invention, the mobile transfer frame is formed of two longitudinal members spaced apart by two transverse spacing bars, the flaps being also mounted transversely on the longitudinal members substantially at both ends of the frame.

Each flap is mounted on the frame for movement about horizontal axes, so as to be able to be placed independently in the horizontal position and let the vials pass.

Moreover, each flap is operated independently for rotation about its horizontal axis by at least one jack.

The device according to the invention can be used either in connection with a mobile carriage or in direct connection with a lyophilisation tank.

In the first case, the flat surface for storing the vials collected by the frame forms part of a mobile carriage which supports said frame and conveys the vials to a lyophilisation tank.

In the second case, the flat surface for storing the vials collected by the frame is formed of one of the racks of a lyophilisation tank which supports said frame, the vibrating table being immediately adjacent said tank. In this case, the empty space between the rack and the tray of the vibrating table is occupied by a horizontal mobile plate and a complementary pivoting platen mounted on small support arms articulated to the plate.

According to another particular feature of the invention, retraction of an access door to the lyophilisation tank causes lowering of the retractable stop and of the pivoting platen to ensure continuity between a rack and the vibrating table.

In a variant of the invention, another unloading vibrating table is associated with the loading vibrating table and is disposed at the same level, between the latter and the inlet of the lyophilisation tank, for laterally discharging the vials by simultaneous action of the two vibrating tables.

Advantageously, the unloading table opens laterally onto a non-vibrating rotary tray which distributes the vials outwardly through a conduit and it is limited by retractable stops.

In yet another variant of the invention, the means for blocking the vials on the upper tray of the vibrating table is formed of a mobile part serving as member for retaining and distributing the vials and which extends transversely above the vibrating table on the same side as the vial feed passage. Advantageously, the mobile part is a retention and distribution pusher supporting an equalizer extending transversely above the vibrating table, whose passage openings may be closed by closure means, said pusher being slidable above the vibrating table.

The equalizer is essentially formed of a rake, extending above the whole width of the vibrating table, transversely to the two lateral longitudinal members of the retention and distribution pusher.

Advantageously, passage openings are provided on the front face of the rake, whereas the rear face of said rake is profiled so as to form funnel shaped cavities opening rearwards and communicating with the front openings.

BRIEF DESCRIPTION OF THE DRAWINGS

Other particular features and advantages of the invention will be clear from the following description of embodiments, with reference to the accompanying drawings which show.

DESCRIPTION OF THE INVENTION

Figure 1:
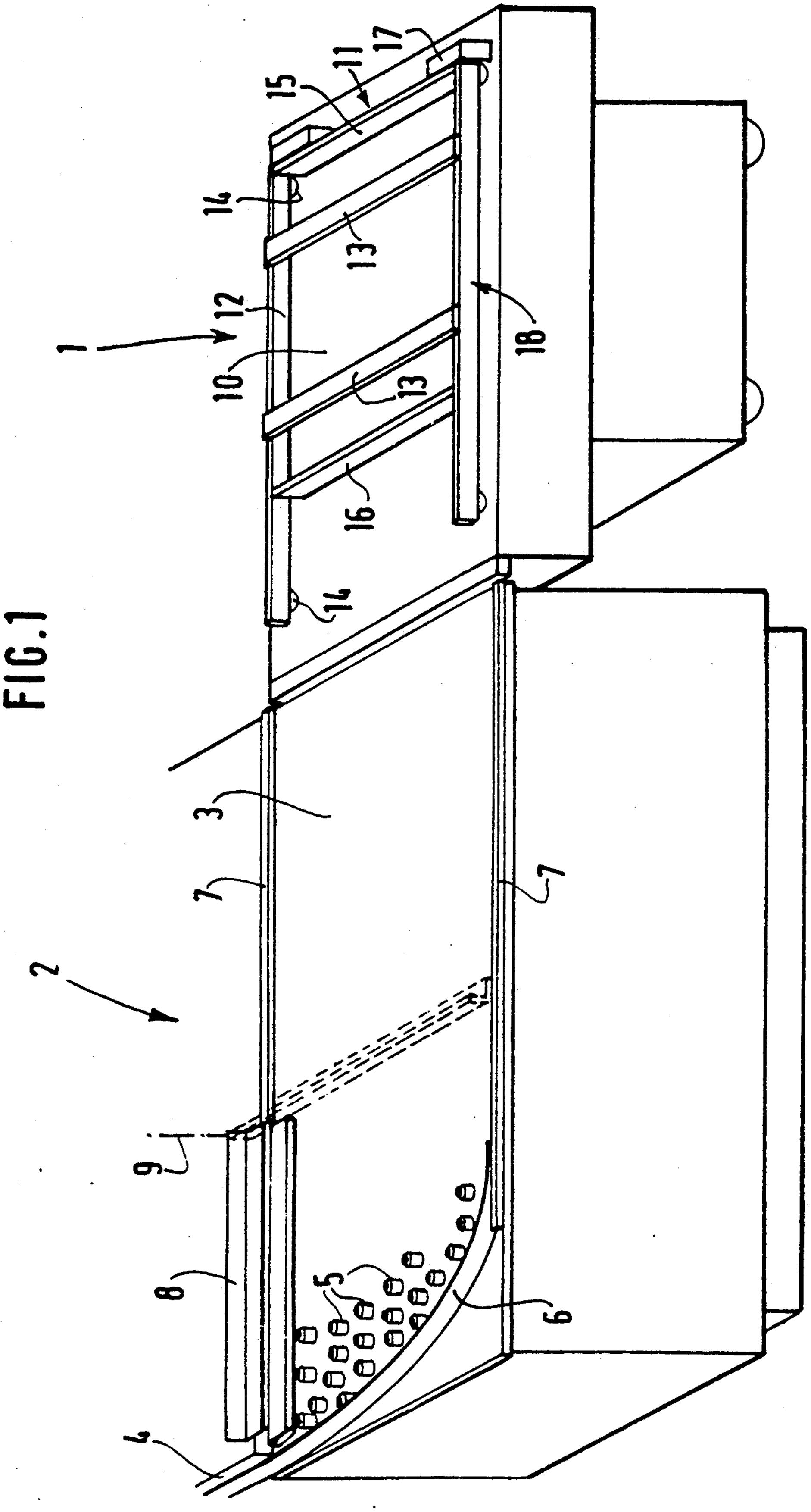
FIG. 1, a schematic perspective view of the vibrating table associated with a mobile carriage.

In FIG. 1 a mobile transfer carriage has been shown, designated as a whole by the reference 1 and a vibrating table 2. The table has an upper tray 3 and a conveyor or screw 4 feeding vials 5 which opens into a tray corner through a single channel or else in sectors defined by switching means as will be explained further on. The vials are oriented towards the center of the tray by a fixed deflector flap 6, in the form of an arc of a circle, one of its ends extending to conveyor 4, the tray being edged on its two longitudinal sides by guide angle irons 7. A mobile arm 8 mounted along one edge of the table pivots about a vertical axis 9. In the position shown, it has no effect on the feeding of the vials. It may occupy another position at 90° shown with broken lines transversely to the vibrating table, in which it closes the passage towards the other end of the table. The mobile arm 8 may also occupy a low position in which its lower portion is flush with the vibrating table or a high position in which, while remaining parallel to itself and parallel to the table, it is situated at a few centimeters above the latter. For that, the arm is slidable heightwise along shaft 9 by means of a mechanism not shown.

Furthermore, carriage 1 is covered by plate 10, for supporting the vials, which is situated at the height of the tray 3 of the vibrating table 2. Plate 10 supports a mobile frame 11 formed of two longitudinal members 12 spaced apart by two transverse spacer bars 13, which form the framework of the frame. It is mounted on wheels 14 enabling it to move on the carriage and on the vibrating table. For this, the carriage and the vibrating table are equipped with rails on which the wheels are guided.

It is equipped, at one of its ends, with a first transverse flap 15 rotatable about a horizontal axis and at its other end, substantially short of the end of the longitudinal members, with a second transverse flap 16 also rotatable about a horizontal axis. Each flap, in the vertical position shown, is flush with the surface of the support on which the frame rests and prevents the vials from passing. On the other hand, when a flap has pivoted into the horizontal position, it lets said vials freely pass. The flaps are operated independently by at least one jack 17 via control rods 18. When the fixed vibrating table 2 and the mobile transfer carriage 1 are placed side by side as shown in FIG. 1, with their upper trays 3 and plate 10 at the same level, it will be understood that the mobile frame 11 mounted on wheels may readily pass from one to the other. The role of carriage 1 is then to recover the vials 5 accumulated on the vibrating table 2, convey them as far as a lyophilisation tank and unload them there.

Figure 7:
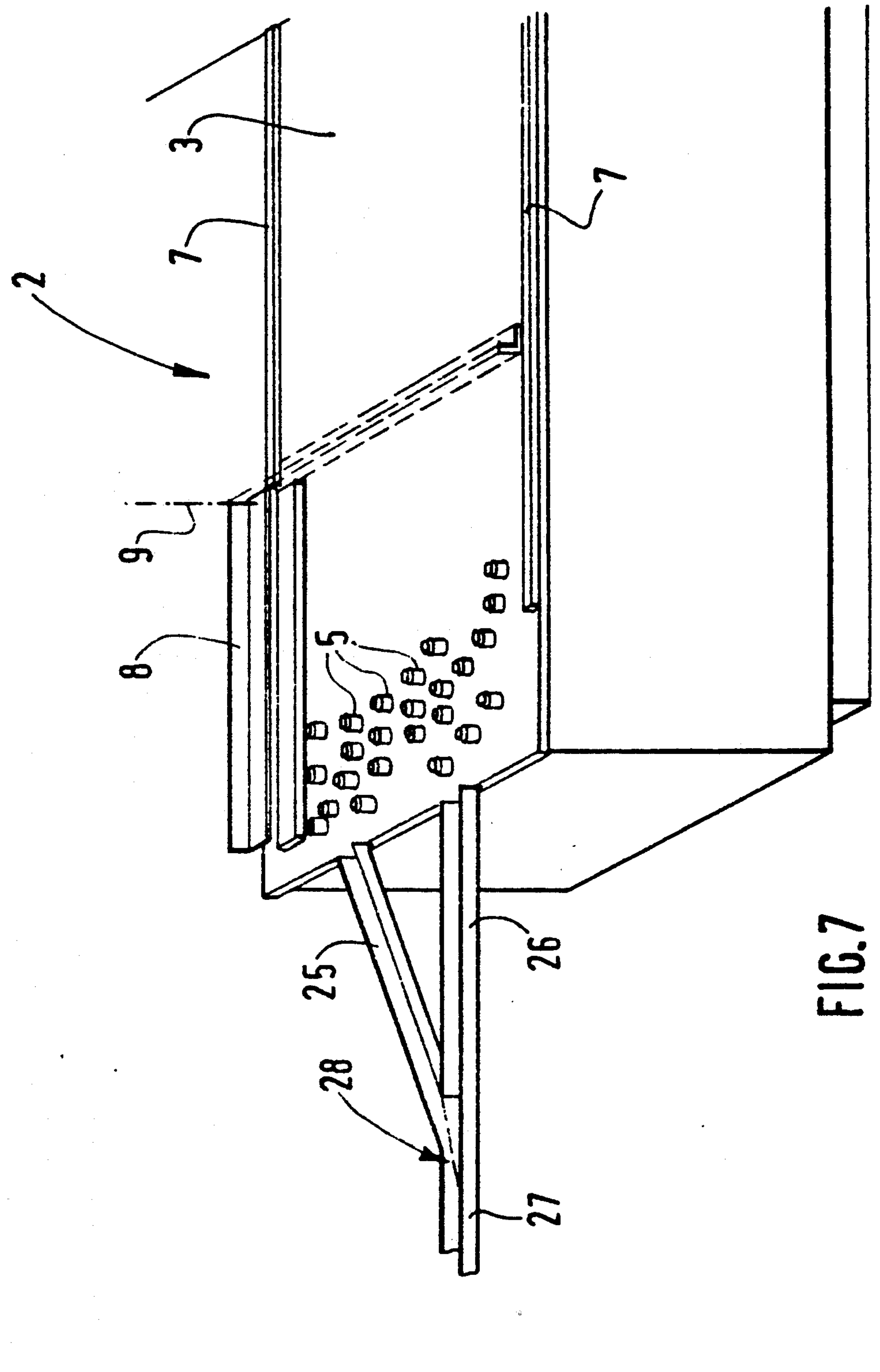
FIG. 7 a partial schematic view according to FIG. 1, of a variant of construction.

In the variant shown in FIG. 7, it is no longer a single conveyor which emerges at a corner of the vibrating table 2, but two belt sections 25 and 26 or screws which feed the table by its end and thus ensure a more even distribution of the vials as they arrive on tray 3. The two sections are themselves fed by a single conveyor 27 via a switching means 28. In another variant, not shown, sections 25 and 26 could be fed quite independently by packing stations. In such a case of feeding the vibrating table by its end, a fixed deflector is not necessarily useful.

Figure 2:
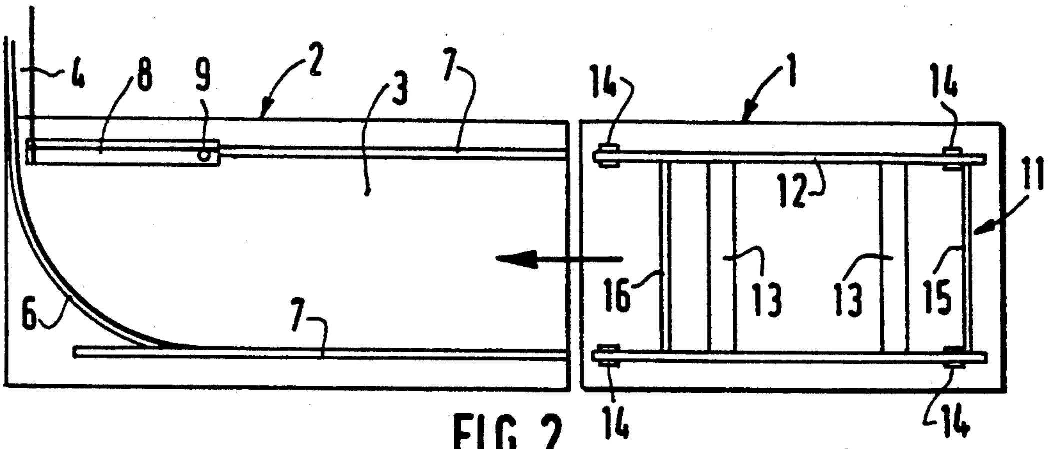
FIGS. 2 to 5, plan diagrams showing the phases for loading the mobile carriage.

The operation for recovering the vials takes place in the following way, from the position shown in FIG. 2.

Figure 3:
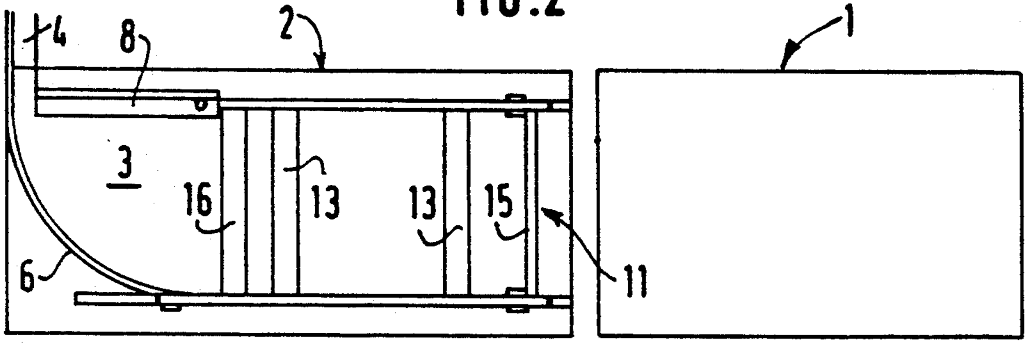

First of all the mobile carriage 1 supports the mobile frame 11 which is momentarily immobilized there. Flap 15 is lowered but flap 16 is open (in the horizontal position). Then the mobile frame 11 is moved in the direction of the vibrating table 2 above which it will be immobilized after travelling over the guide angle irons 7. The mobile arm 8 of the vibrating table 2 occupies the position shown in FIG. 3. The conveyor 4 feeds tray 3 continuously with vials 5. The latter move over said tray, are guided by the fixed flap 6 then are accumulated at the end of the vibrating table against the flap 15 of the mobile frame.

Figure 4:
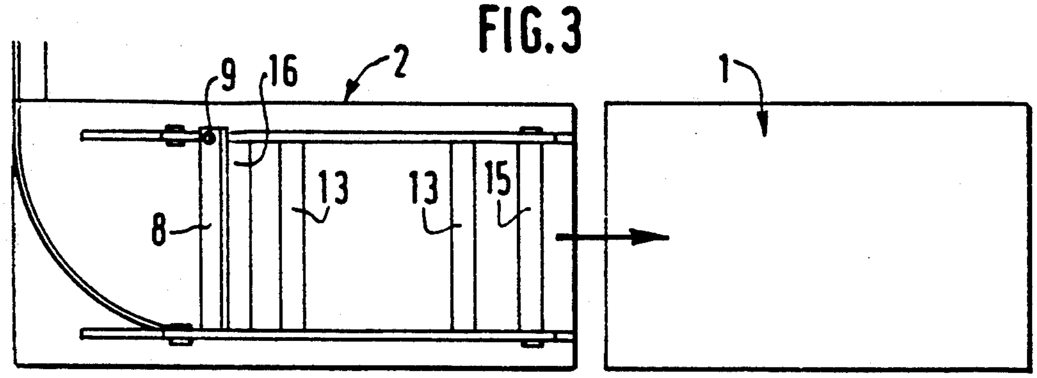
Figure 5:
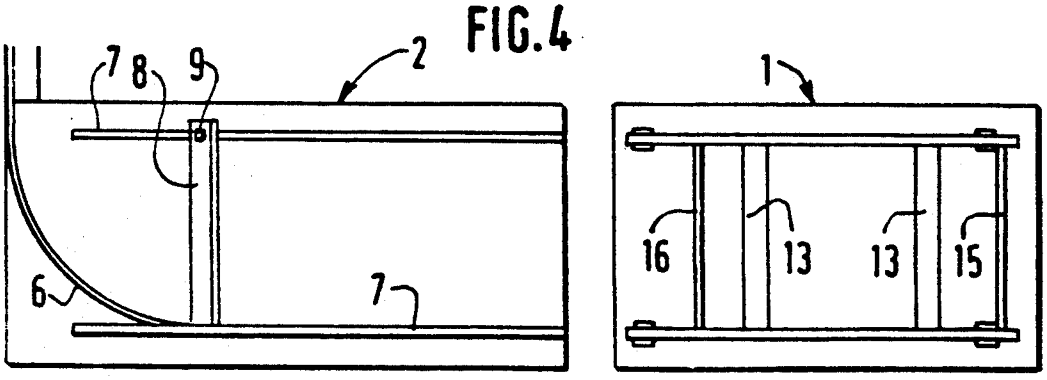

Near the end of filling, measured by a counter, of the space separating the two flaps 15 and 16, the mobile arm 8 pivots into the low position which results in pushing the vials further into the feed zone towards the mobile frame 11 where they complete the accumulation. The right-angled mobile arm 8 moves under flap 16 (FIG. 4). Then flap 16 is closed (lowered position). Then the mobile frame 11 moves in the opposite direction towards carriage 1 on which are thus transferred all the vials "imprisoned" between the flaps, as can be seen in FIG. 5. Meanwhile, the vials which continue to feed the vibrating table 2 continuously via the conveyor 4 or the screw, pile up in a storage space on upper tray 3 in front of the mobile arm 8. The mobile carriage 1 moves towards the lyophilisation tank where it will unload the vials by an identical unloading operation of the mobile frame 11 and opening or closing the raisable flaps 15 and 16. Another mobile carriage may take its place near the vibrating table. As soon as its mobile frame has been moved over the vibrating table, the mobile arm 8 rises, thus freeing the accumulated vials, and comes back to its first position along the table. A new cycle for filling the mobile frame with a view to transferring the vials on to the mobile carriage is then begun. It was mentioned above that the mobile carriage 1 was able to distribute its load to any one of the lyophilisation tanks chosen, whether they are close or not to the vibrating table. The simultaneous "rotation" of several carriages between several tanks, even several vibrating tables, provides great flexibility and high loading speed since, with this system, there is no interruption in the continuous feeding of the vials to be treated. These carriages may transfer their load on to one or other of the superimposed racks which equip a tank and which move in turn to the desired level.

Figure 6:
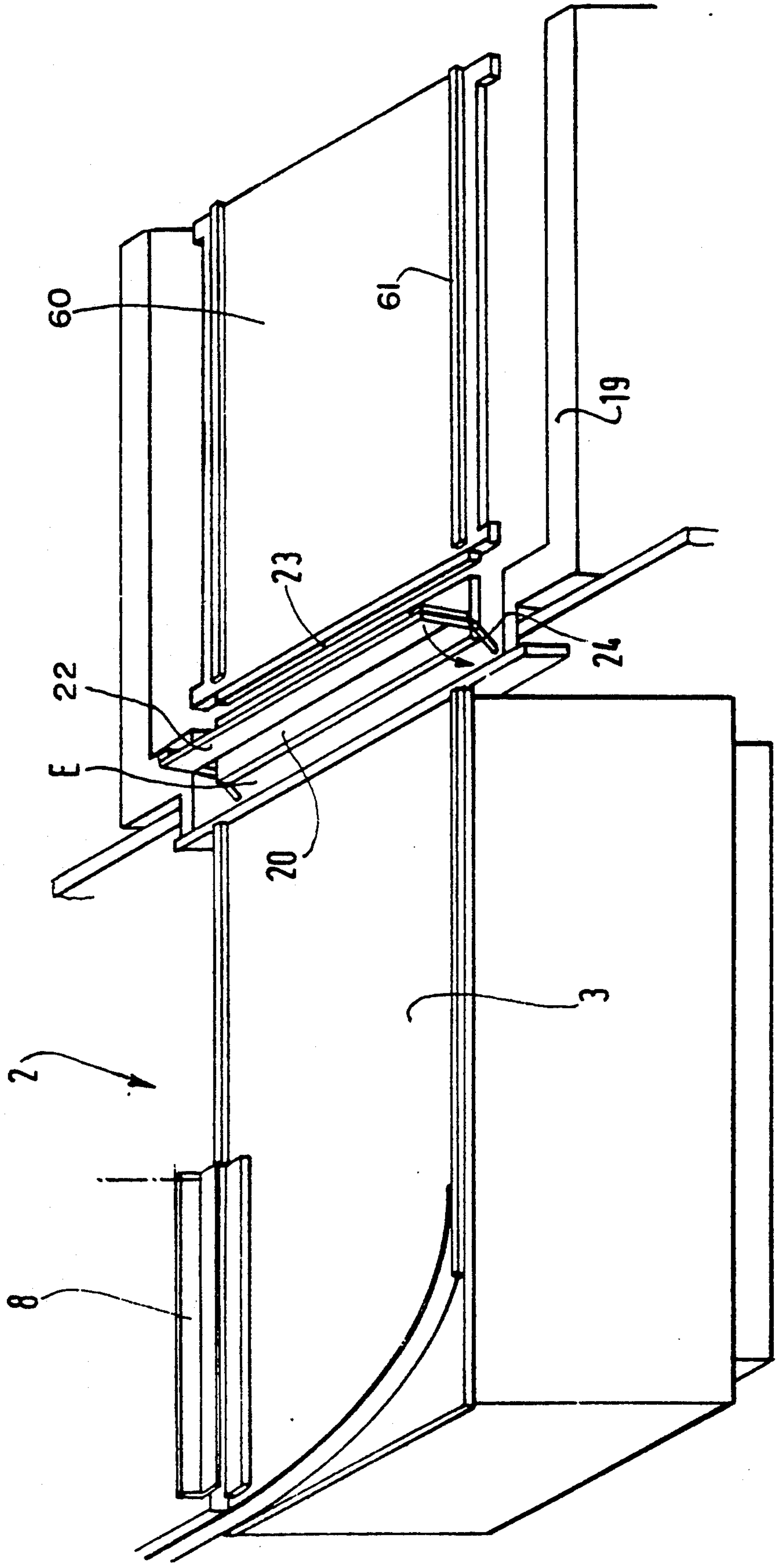
FIG. 6, a schematic perspective view of the vibrating table associated with a lyophilisation tank.

It may however be advantageous in some cases to associate a vibrating table directly with a tank so that the vials are transferred directly on to a rack. In this case, a rack 60 may itself be equipped with a mobile frame. It can be seen in the variant shown in FIG. 6 that this rack 60 is edged by angle irons 61 for guiding the vials and the mobile frame. The front end of the rack on its access opening side further receives a retractable stop 23. The rack is of course inside a lyophilisation tank 19 which is contiguous to the vibrating table 2. But between the latter and the rack there is an empty space E forming a discontinuity with tray 3. The space in question is occupied by a mobile horizontal plate 20 which is located between tray 3 of the vibrating table and the tray of rack 60. A complementary pivoting platen 22 is mounted on small support arms 24 articulated to plate 20. The plate and the platen have the same length as the width of rack 60. The platen 22 has a width which compensates, with the width of plate 20, for the empty space E separating the vibrating table from the rack. In the position shown in FIG. 6, platen 22 is raised, whereas a door of an access chamber (not shown) is in its top position, ensuring separation between tank 19 and the vibrating table 2. When the door is lowered, the mobile plate 20 comes into contact with the rack and, through the action of pushers not shown, causes the retractable stop 23 to be lowered. With the arms 24 released by retraction of the door, platen 22 may be lowered in the direction of the arrow until it occupies a horizontal position where it fills the last empty space existing between plate 20 and the vibrating table 2. Continuity is ensured—for loading or unloading—between the rack and the vibrating table, since stop 23 is retracted.

Thus, the mobile frame can pass from one to the other. The operations for unloading and transferring the vials may take place in a way identical to the operation described relative to a mobile carriage, via the mobile carriage and its pivoting flaps.

For unloading, with the lyophilisation operation finished, it is more economical not to immobilize the apparatus for too long and to unload all the vials simultaneously using a carriage with several stages, each being equipped with a mobile transfer frame comparable to that for loading. For questions of:

compliance with the sterility class of the premises and the design of the latter, compliance with pharmacopoeia standards, organization, planning or availability of apparatus, it may however be preferable to unload rack by rack in the loading room itself.

Figure 8:
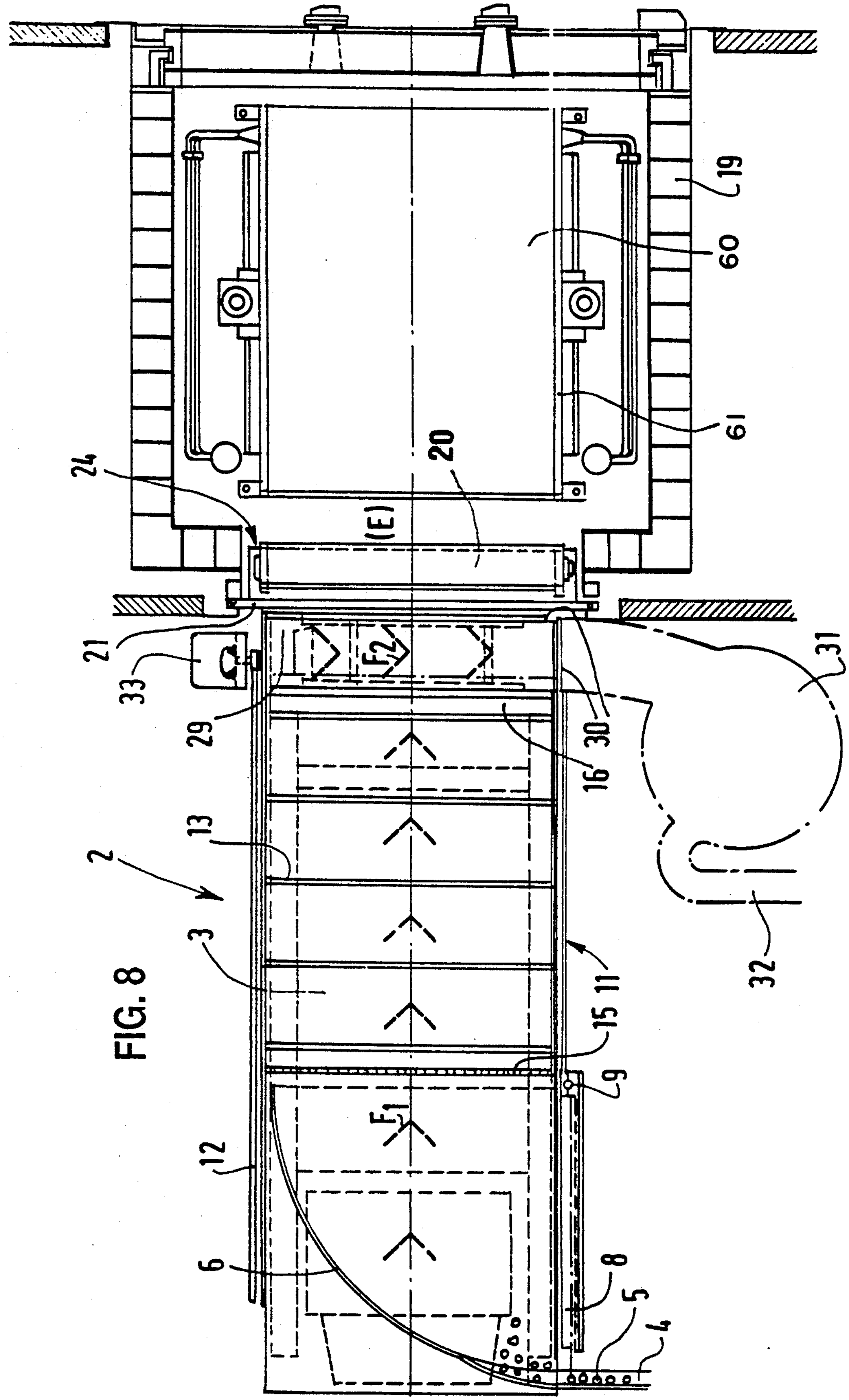
FIG. 8 a schematic plan view of a variant of the device.

In a variant shown in FIG. 8, the loading vibrating table 2 is shown whose upper tray 3 is fed with vials 5 by the arrival conveyor 4. The vials are oriented towards the center of the tray by the fixed deflector flap 6. The mobile arm 8 is mounted along one edge of the table, which may pivot about the vertical shaft 9 for placing itself transversely to the table; it slides heightwise along shaft 9 and may thus occupy a low position in which it cooperates with the vials or a top position in which it moves above said vials. The vials accumulated on tray 3 move under the effect of the vibrations, in the direction of arrows F, i.e. in the longitudinal direction of the vibrating table. Above the tray of the vibrating table 2 there rests, on fixed lateral rails, the mobile frame 11 formed of two longitudinal members 12 spaced apart by transverse spacing bars 13 and equipped with transverse flaps 15, 16 rotatable about a horizontal axis. A motor 33 ensures movement of the mobile frame over its rails.

At the end of tray 3 of the loading vibrating table 2, another vibrating table 29 is disposed at the same level, which is an unloading table whose vibrations unload the vials in the direction of arrows F2, i.e. transversely to the direction of movement F1 of the vials over the loading table 2. Retractable stops 30 limit said table 29 which opens laterally onto a non-vibrating rotary tray 31, which distributes the vials through a conduit 32, towards a capping machine.

The unloading table 29 then extends transversely between the loading table 2 and a lyophilisation tank 19 equipped with racks 60 and edged with angle irons 61 for guiding the vials. At the level of the tables, the tank is closed by a vertically moving door 21 cooperating via an articulation of arm 24 with a horizontal mobile plate 20 compensating for and occupying the empty space E existing between the rack 60 and the unloading table 29.

When it is a question of loading vials on to a rack 60, and when for this door 21 is open, there is continuity between the planes of the rack 60, plate 20, the unloading table 29 and the loading table 2. During the loading phase, the unloading table 29 does not vibrate and consequently behaves like a fixed tray, the operations for loading the racks by means of the mobile transfer frame 11 take place from the situation shown in FIG. 8.

Figure 9:
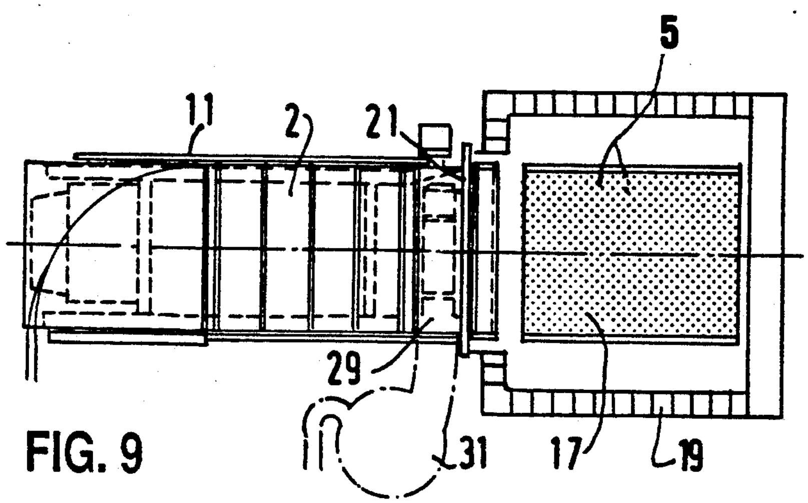
FIGS. 9 to 12, plan diagrams showing the loading—unloading phases of a lyophilisation tank, according to the variant of FIG. 8.

FIG. 9 illustrates the situation at time zero of the unloading procedure. The mobile frame 11 has come back to its position on the vibrating table 2. Furthermore, the door 21 of the lyophilisator is closed and vials 5 are in position on rack 60.

Figure 10:
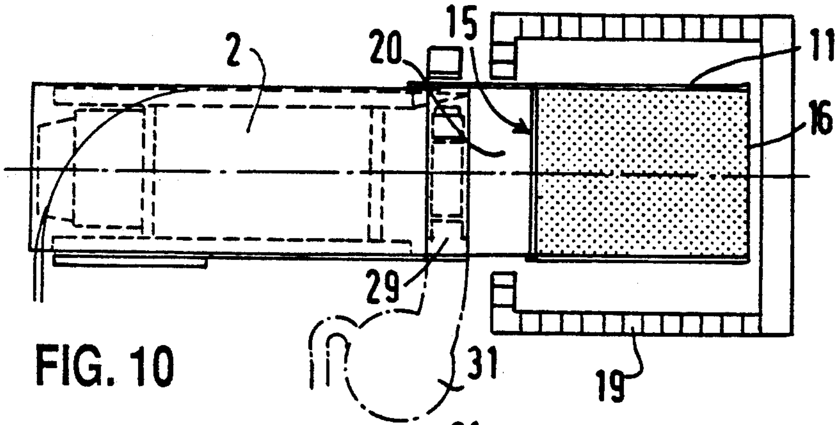
Figure 11:
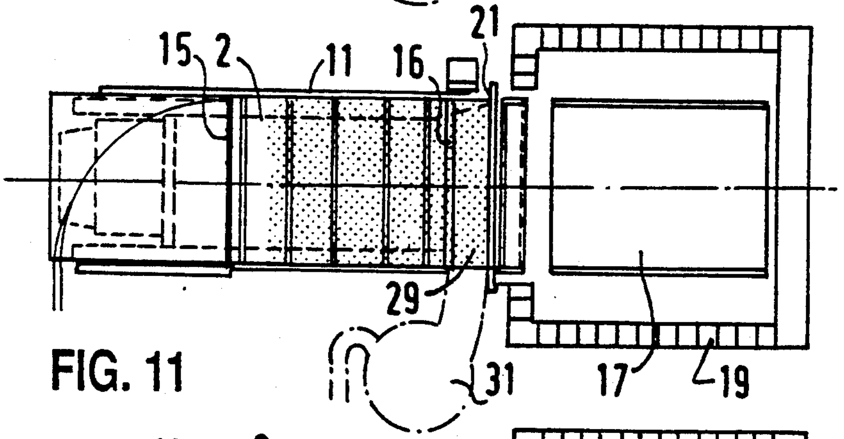

In the position shown in FIG. 10 corresponding to a first unloading phase, the door is open and the mobile frame 11 is engaged inside the lyophilisator, its front flap 16 and its rear flap 15 being in the vertical position, i.e. they imprison the vials 5 which are thus blocked on rack 60 inside the mobile frame. The unloading operation properly speaking begins by the transfer of these vials outside the lyophilisator, by means of the mobile frame. It can be seen in FIG. 11 that the frame has been immobilized so that loading of the vials which it imprisoned rests partly on the unloading table 29 and for a larger part on the loading table 2. So that a part of the vials remain on table 29, at the end of the return travel of the frame towards the loading table, it was necessary for the front flap 16 to be raised when it passed above the inlet of table 29, for stopping the advance of the vials.

Figure 12:
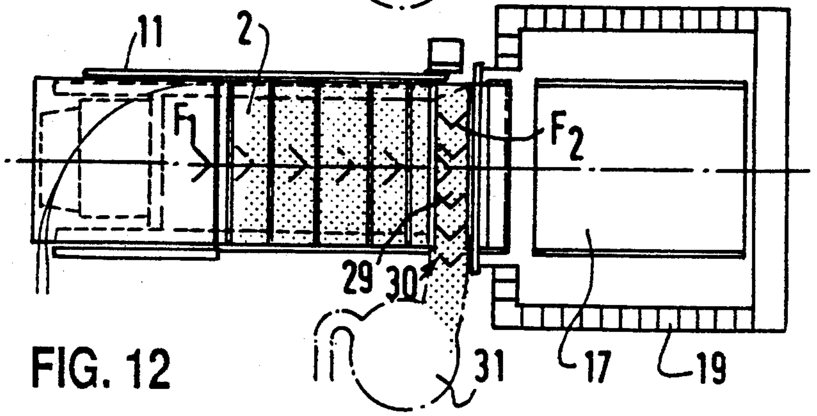

Once the vials are thus immobilized the two tables 2 and 29 are set in vibration. The vials 5 resting on the unloading table 29 are then released on the side in the direction of arrows F2, after the intermediate retractable stop 30 has been raised, in the direction of the rotating tray 31. Simultaneously, the vials resting on the loading table 2 move in the direction of arrows F1 towards the lyophilisator, for feeding the unloading table and permanently compensating for the discharged vials, as can be seen in FIG. 12.

As soon as the operation is finished, stop 30 comes back into position, the door of the lyophilisator opens again, the following filled rack comes up to the level, then the mobile frame, in accordance with the described procedure, will fetch a new stack of vials for unloading.

Thus, with a single set of vibrating tables, vials may be loaded and unloaded automatically in the same room, on the same side of the lyophilisator, and without transfer on to an intermediate mobile carriage.

In these different variants it has been seen that the vials are guided and oriented towards the center of the tray and grouped together as compactly as possible by means of the fixed deflector flap and/or the pivotable mobile arm. It has been discovered that under certain particular conditions of use, as well as for certain categories and numbers of vials to be transferred, use of the mobile arm does not always give complete satisfaction particularly for compactly regrouping the vials at the edge of the table.

Figure 13:
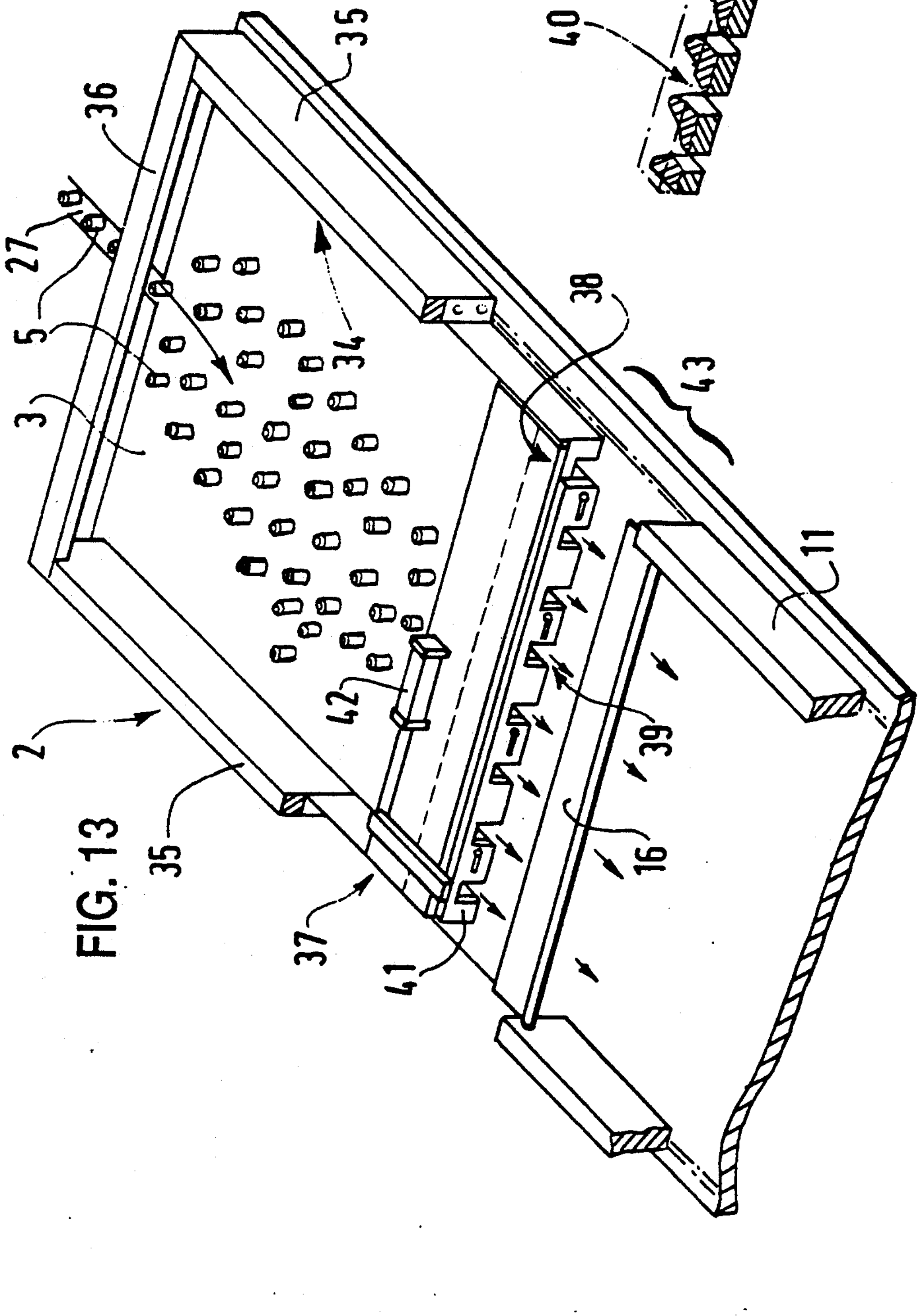
FIG. 13, a partial perspective view of another vibrating table variant with its retention and distribution pusher.

The variant illustrated in FIG. 13 shows the end of a loading vibrating table 2 whose tray 3 is fed with vials 5 by a conveyor 27 opening at the end of said tray. The table is provided with a mobile transfer frame 11, only a part of which has been shown, equipped with a transverse flap 16 rotatable about a horizontal axis.

Figure 14:
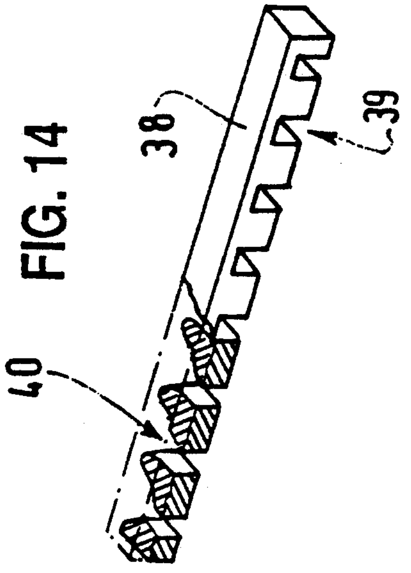
FIG. 14, a perspective view of the rake of the equalizer with parts cut away.

Above the tray, from its end, a retention and distribution pusher 34 may slide, formed essentially of two lateral longitudinal members 35 joined together at the end by a tie 36 above the plane of the vials. The pusher in question moves under the action of any mechanism, not shown, so that the longitudinal members 35 slide for example on the lateral edges of the tray of the vibrating table. It may then move in the direction of the transfer frame 11 then come back to its first position at the end of the vibrating table. The front portion of the longitudinal members 35, in the direction of the transfer frame 11, supports an equalizer designated generally by reference numeral 37, whose structure can also be seen in FIG. 14. Said equalizer 37 is formed essentially of a rake 38 extending transversely to the longitudinal members 35 above the whole width of the table. The front face of the rake (in the direction of the transfer frame) is formed with rectangular passage openings 39 whereas the rear face is profiled so as to form funnel-shaped cavities 40 opening rearwards and communicating with the openings 39 as can be seen in the left-hand part of FIG. 14. Rake 38 is fixed and fast with the longitudinal members 35. In front of the rake is disposed a sliding closure means 41 which is a sort of grid with rectangular openings having the same spacing and dimensions as openings 39 of the rake. The closure means 41 is operated by a jack 42. The intermediate zone 43 between equalizer 37 and the transfer zone 11 is a zone where the vials are counted by cells, not shown.

In the position shown in FIG. 13, pusher 34 and frame 11 are immobile. The vials 5 fed by conveyor 27 are dispersed on the tray 3 of the vibrating table upstream of the equalizer 37; they reach the equalizer and are channelled smoothly by the cavities 40 of rake 38. With the closure means 41 in the open position, the vials pass through the rake through the openings 39 and pile up in the zone of the transfer frame 11, passing under flap 16 which is raised. The vials are counted as they pass through the intermediate zone 43.

Figure 15:
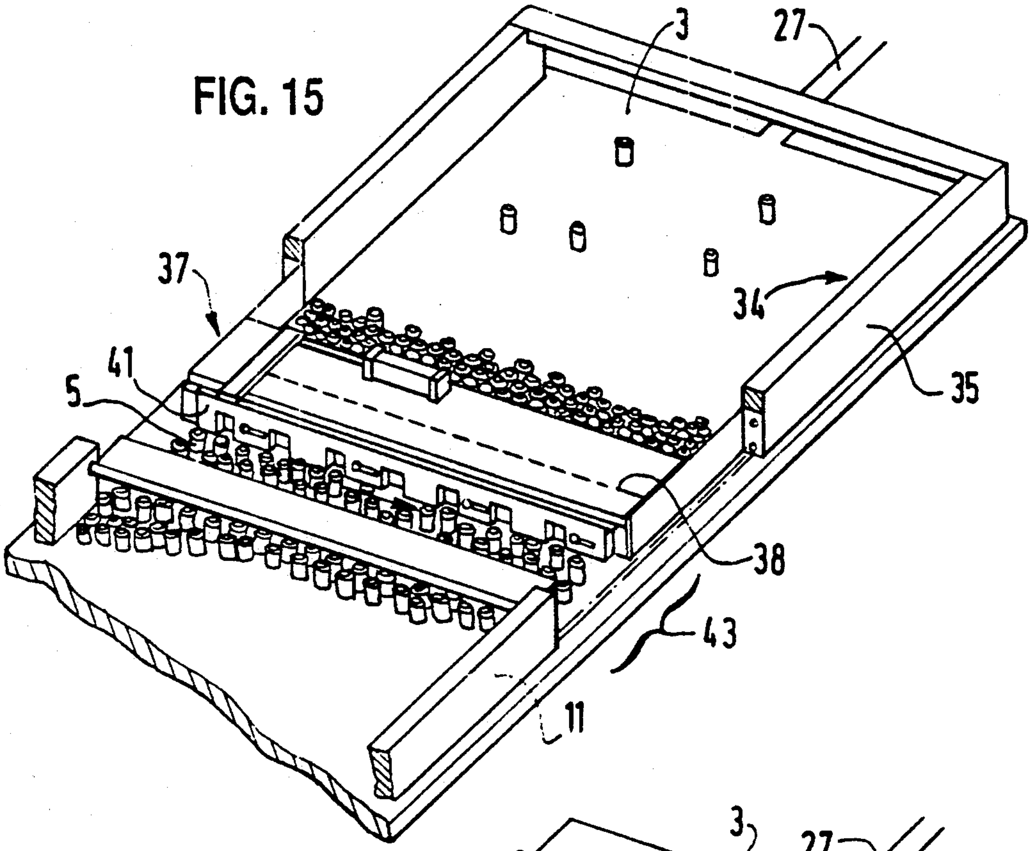
FIGS. 15 and 16, perspective views of the vibrating table and of the pusher during other operating phases.
Figure 16:
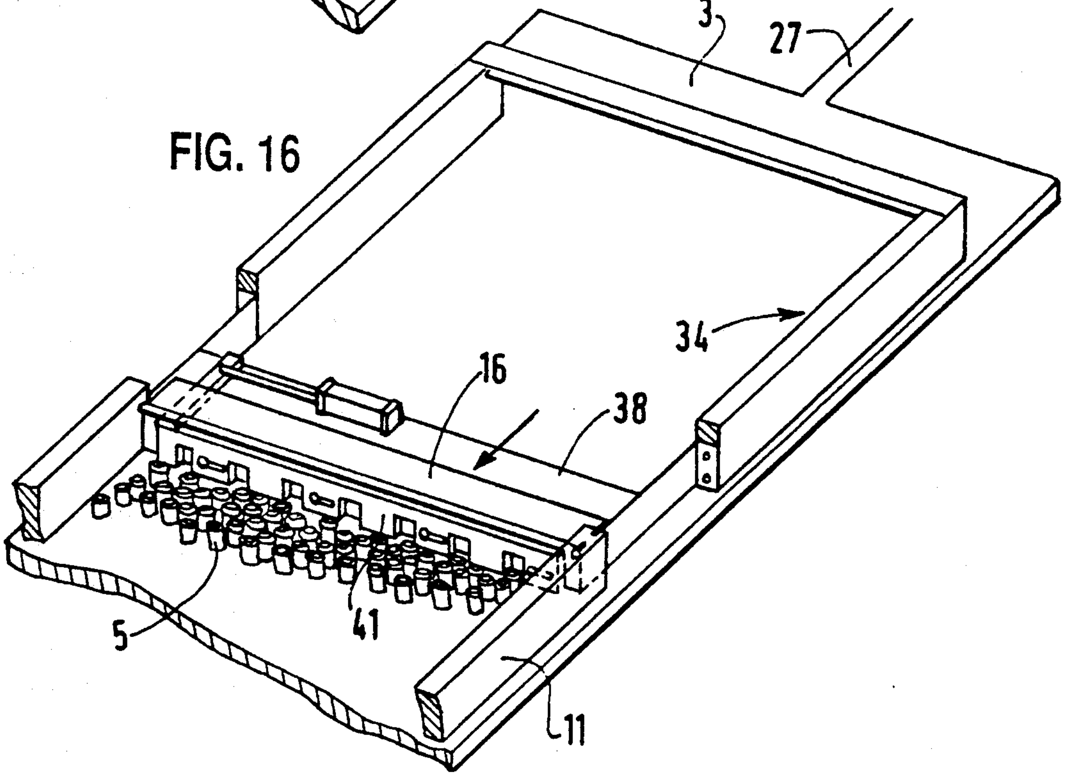

When the counting has reached a predetermined number of vials accumulated in the transfer frame 11, closure means 41 closes. The vials 5 are immobilized and then accumulate on tray 3 of the vibrating table upstream of the equalizer 37, inside the retention and distribution pusher 34, still immobile. During this phase, illustrated in FIG. 15, a certain number of counted vials remain on the vibrating table, upstream of the transfer frame 11 in the intermediate zone 43. Before the transfer these vials must be recovered. For that, as is shown in FIG. 16, pusher 34 has moved above tray 3 in the direction of frame 11 until rake 38 has passed under flap 16 of frame 11, still immobile. The closure means 41 have thus pushed the counted vials from zone 43 into the zone of the transfer frame.

The retention and distribution pusher 34 may then come back to its first position without hindering the accumulation of the vials which is taking place. The transfer frame 11 is then filled with the exact number of counted vials. Its flap 16 will be lowered and it may then transfer its accumulated number of vials towards the lyophilisation tank. When this operation is finished, it will come back to the position shown in FIG. 13, then the closure means of the equalizer will open again to release a new series of vials 5 smoothly and continuously through openings 39.

Figure 17:
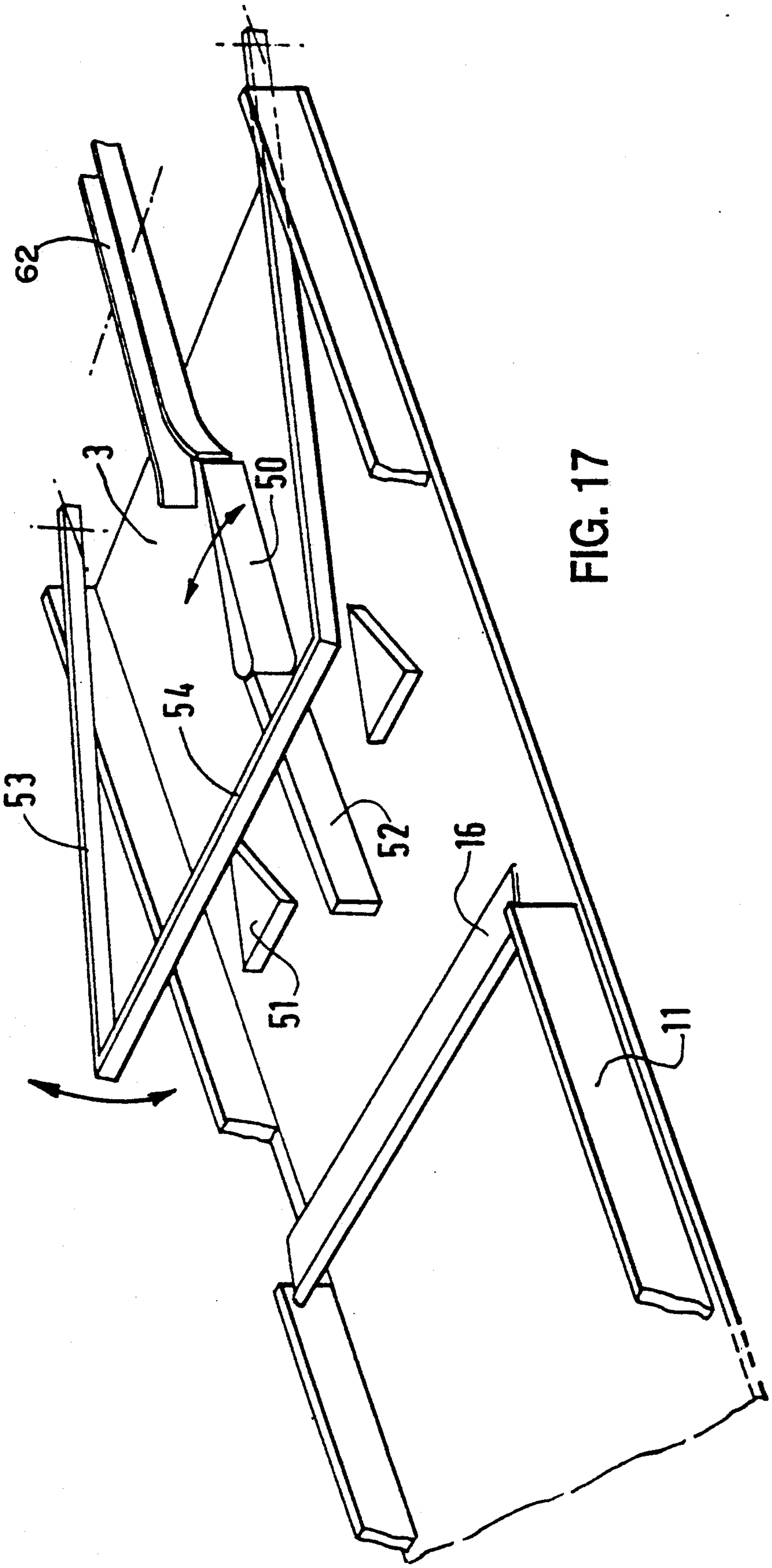
FIGS. 17 and 18, simplified perspective views of the vibrating table equipped, in a variant, with a retention and distribution bar in two operating phases.

In another variant, shown in FIG. 17, instead of a retention and distribution pusher, the tray is equipped with a retention and distribution bar 54 mounted transversely above tray 3, on the end of lateral arms 53. The arms form with the bar a frame capable of pivoting about horizontal pivoting pins at the ends of arms 53. Plate 3 is further equipped with a median partition 52 ending, on the same side as the vial feed passage 27, with an orientable flap 50 able to cause the vials to pass from one side or the other of the partition. Diffusers 51, on each side of this partition, further improve the distribution of the vials.

In the position shown in FIG. 17, bar 54 is in the raised position. The transfer frame 11 is immobile and its flap 16 is also raised. The vials arrive through passage 27, in a single file for example at the rate of ten vials per second and they are counted before being fed on to tray 3 of the vibrating table. Since the bar 54 is raised, the vials pass thereunder until a certain number have been counted. It will be noted that the vials are distributed alternately to the right and left of partition 52 in predetermined amounts, then they fill the transfer frame 11.

Figure 18:
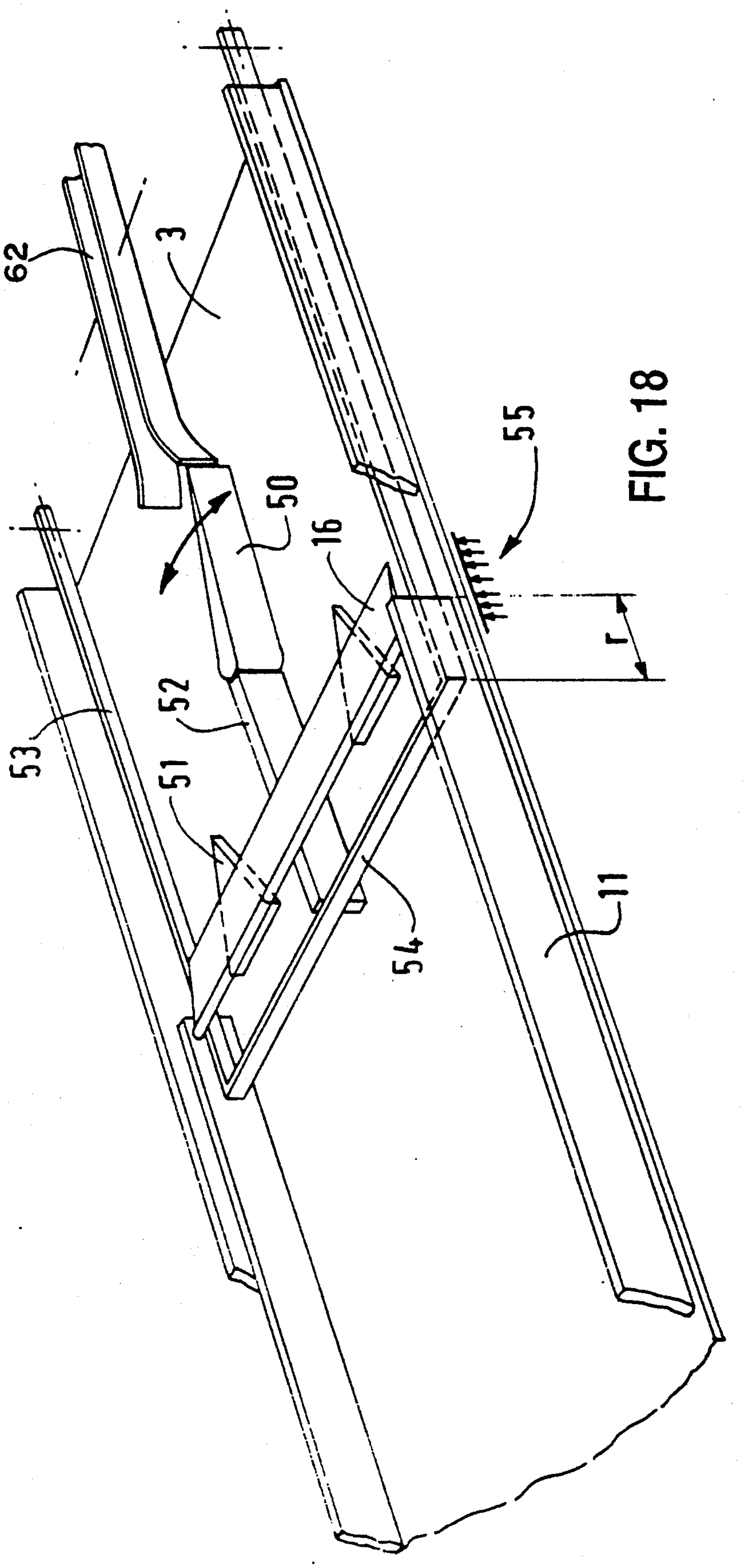

The next sequence is illustrated by FIG. 18. Bar 54 has been lowered and the carriage 11, with flap 16 raised, moves back in the direction of passage 62. It will then press the vials against bar 54. But this time the distance over which the carriage moves back is measured and shown in FIG. 18 by the distance r. An optoelectronic device 55, with several cells, located close to bar 54 on the side of the table whose spacing corresponds to the diameter of the vials enables the number of vials to be introduced to be determined so as to have the exact capacity of a rack. This amount may then be measured at the inlet of the table. Then the carriage takes up its position again and when the amount of missing vials has passed into the carriage, flap 16 is lowered and the transport takes place.

We claim:

1. A device for sequential loading and unloading of racks of a lyophilisation tank provided for a plurality of vials coming from a station feeding said vials continuously, comprising:

at least one vibrating table, said vibrating table being equipped with a tray and at least one mobile means for blocking said vials over at least a part of the tray of the vibrating table;

a mobile transfer carriage positionable immediately adjacent said vibrating table for receiving assembled vials therefrom; and a mobile transfer frame having retractable flaps, said mobile transfer frame being movable between a flat surface of said mobile transfer carriage and a surface of said tray of the vibrating table, such that said mobile transfer frame collects accumulated vials from said at least one vibrating table and transfers the accumulated vials to said mobile transfer carriage.

2. The loading and unloading device according to claim 1, wherein said mobile means for blocking the vials on said tray of the vibrating table comprises a mobile arm, mounted along one edge of said table and pivotable about a vertical shaft, so as to occupy a position transverse to the vibrating table, said arm being slidable heightwise along said vertical shaft.

3. The loading and unloading device according to claim 1, further comprising a deflector flap, in the form of an arc of a circle, disposed above said tray of the vibrating table, said deflector flap having one of its ends extending to a belt which feeds vials continuously onto said vibrating table.

4. The loading and unloading device according to claim 1, further comprising at least two supply belt sections opening out at an end of said vibrating table.

5. The loading and unloading device according to claim 1, wherein said mobile transfer frame is formed of two longitudinal members spaced apart by two transverse spacing bars, and wherein said flaps are mounted transversely on said two longitudinal members substantially at both ends of said mobile transfer frame.

6. The loading and unloading device according to claim 1 or 5, wherein each flap is mounted on said mobile transfer frame for movement about horizontal axes, so as to be placed independently in a horizontal position such that said vials pass freely.

7. The loading and unloading device according to claim 5, wherein each flap is operated independently for rotation about its horizontal axis by at least one jack and control rods.

8. The loading and unloading device according to claim 1 or 5, wherein said mobile transfer frame includes a set of wheels resting on guide rails provided on said vibrating table and an adjacent flat surface.

9. The loading and unloading device according to claim 1, wherein the flat surface for storing said vials collected by said mobile transfer frame forms part of said mobile carriage which supports said frame and conveys said vials to a lyophilisation tank.

10. The loading and unloading device according to claim 1, wherein the flat surface for storing the vials collected by said mobile transfer frame is formed of one of the racks of the lyophilisation tank which supports said mobile transfer frame, the vibrating table being immediately adjacent said tank.

11. The loading and unloading device according to claim 10, wherein a front end of said one of the racks, on the same side as its access opening, is provided with a retractable stop.

12. The loading and unloading device according to claim 11, further including an empty space between said one of the racks and said tray of the vibrating table, said empty space being occupied by a horizontal mobile plate and a complementary pivoting platen.

13. The loading and unloading device according to claim 12, wherein said complementary pivoting platen is mounted on small support arms articulated to said plate.

14. The loading and unloading device according to claim 13, wherein retraction of an access door to the lyophilisation tank causes lowering of the retractable stop and of a pivoting platen to ensure continuity between said one of the racks and the vibrating table.

15. The loading and unloading device according to claim 1, further including an unloading vibrating table associated with said vibrating table and disposed at the same level, between the latter and an inlet of the lyophilisation tank, for laterally discharging vials by simultaneous action of said vibrating table and said unloading vibrating table.

16. The loading and unloading device according to claim 15, wherein said unloading vibrating table opens laterally onto a non vibrating rotary tray which distributes the vials outwardly through a conduit.

17. The loading and unloading device according to claim 15, further including retractable stops for limiting said unloading vibrating table laterally.

18. The loading and unloading device according to claim 15, wherein the empty space between said one of the racks and the unloading vibrating table is occupied by a mobile horizontal plate cooperating by an articulation with a vertically moving door.

19. The loading and unloading device according to claim 1, wherein said at least one mobile means for blocking the vials on said tray of said at least one vibrating table is formed of a mobile part serving as a member for retaining and distributing the vials and which extends transversely above said at least one vibrating table on the same side as a vial feed passage.

20. The loading and unloading device according to claim 19, wherein the mobile part is a retention and distribution pusher supporting an equalizer extending transversely above the vibrating table, whose passage openings may be closed by closure means, said pusher being slidable above the vibrating table.

21. The loading and unloading device according to claim 20, wherein the equalizer is essentially formed of a rake, extending above the whole width of the vibrating table, transversely to two lateral longitudinal members of the retention and distribution pusher.

22. The loading and unloading device according to claim 21, wherein the passage openings are provided on a front face of the rake, whereas a rear face of said rake is profiled so as to form funnel shaped cavities opening rearwards and communicating with the passage openings.

23. The loading and unloading device according to claim 21, wherein the closure means is slidable in the form of a grid with rectangular opening with the spacing and dimensions of the passage openings of the rake.

24. The loading and unloading device according to claim 21, further including an intermediate zone between the equalizer and the transfer frame where the vials passing through the rake are counted.

25. The loading and unloading device according to claim 19, wherein said mobile part is a retention and distribution bar mounted at an end of lateral arms, and pivoting about horizontal shafts.

26. The loading and unloading device according to claim 25, wherein a backward travel of the transfer carriage is measured by an optoelectronic device with several cells located close to a bar of said mobile part on the table side.

27. The loading and unloading device according to claim 19, wherein the tray is equipped with an orientable flap for the distribution of vials on each side of a median partition.

28. The loading and unloading device according to claim 27, wherein the tray is equipped with diffusers, on each side of the median partition.

* * * * *